UNITED STATES PATENT OFFICE.

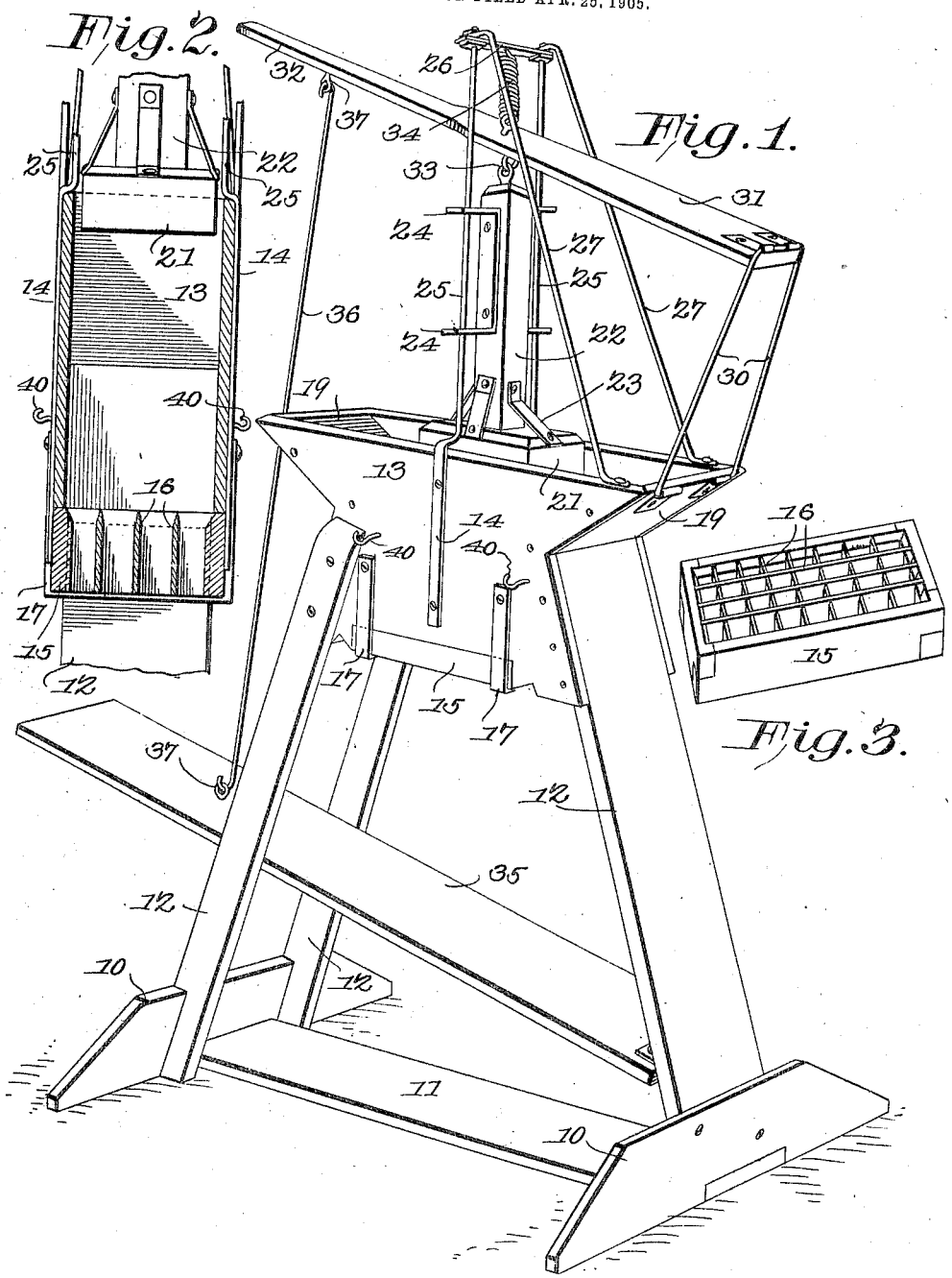

ISAAC B. LANSFORD, OF CROCKETT, TEXAS.

POTATO-CUTTER.

No. 821,652.  Specification of Letters Patent.  Patented May 29, 1906.

Application filed April 25, 1905. Serial No. 257,331.

*To all whom it may concern:*

Be it known that I, ISAAC B. LANSFORD, a citizen of the United States, residing at Crockett, in the county of Houston and State of Texas, have invented a new and useful Potato-Cutter, of which the following is a specification.

This invention relates to potato-cutters and devices of similar class for cutting vegetables and other articles, the principal object of the invention being to provide a machine by which vegetables or similar articles may be rapidly cut into comparatively small pieces for planting, cooking, or other purposes.

A further object of the invention is to provide a machine of this type which may be rapidly fed without danger to the operator, and, further, to provide for the cutting of the articles into pieces of different size in accordance with the purposes for which they are intended.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a potato-cutter constructed in accordance with the invention. Fig. 2 is a vertical sectional view of the upper portion of the same. Fig. 3 is a detail perspective view of one of the knife-carrying frames, detached.

Similar numerals of reference are employed to indicate corresponding parts throughout the several figures of the drawings.

The apparatus forming the subject of the present invention is intended principally for the rapid cutting of potatoes in large quantities for planting; but it may be used to advantage in the preparation of potatoes and other vegetables for cooking purposes, or for the cutting of articles of various kinds for any purpose.

The framework of the machine includes sills 10, united by a base-bar 11, and from the sills extend inclined standards 12, that converge toward the top and at their upper ends serve as a support for a hopper 13.

The hopper includes opposite cheek-plates 14, the lower edges of which are cut to form recesses for the reception of a knife-carrying frame 15, the latter being preferably rectangular in form and provided with cutting-knives 16 of any suitable character. In practice a number of frames are provided for each machine, the frames being interchangeable and carrying knives spaced at different distances in order to cut a vegetable into pieces of different size. These frames are held in place by pivoted straps 17, preferably of U-shape form, the vertical arms of the straps being pivoted to the cheek-plates and the cross-bars thereof extending under the edges of the frame 15, the straps serving when in position to prevent lateral displacement of said frame. By swinging the straps outward a frame may be readily removed for cleansing or other purposes or in case it is desired to substitute another frame having knives arranged at different intervals.

The opposite ends of the hopper are provided with inclined plates 19, forming runways or chutes for directing the vegetables into a position above the knives 16, the vegetables falling into a cutting-chamber that is disposed immediately below a vertically-movable plunger 21.

The plunger 21, which preferably is formed of wood or of a soft metal or alloy, is of an area equal to the horizontal area of the chamber 20 and is carried by a stem 22, the connection being strengthened by braces 23. The stem 22 is provided with laterally-projecting brackets 24, having openings for the reception of vertical guide-rods 25, the lower ends of which are rigidly secured to the cheek-plates, while the upper ends of said rods are connected by a transverse bar 26, and this bar and the upper ends of the rods are held from independent play by braces 27, the lower ends of which are secured to the cheek-plates.

Pivoted to the rear end of the hopper is a link 30, to the upper end of which is pivoted an operating-lever 31, that extends between the guide-rods 25, and at the front end is shaped to form a convenient handle 26 within reach of the operator. This handle is connected by suitable links 33 to the upper end of the plunger-stem, and between the top of the operating-lever and the cross-bar 26 extends a helical tension-spring 34, tending normally to maintain the lever and plunger in elevated position.

Pivotally connected to one of the standards 12 is a pedal-lever 35, the front end of which is arranged within convenient reach of the foot of the operator, and said pedal-lever is connected to the operating-lever 31 by a link 36, the ends of the link hooking in eyes 37, carried by the two levers, in order to permit its ready detachment, if necessary, so that the machine may be operated by hand-power, by foot-power, or by a combination of the two.

In operation a sack or other receptacle to contain the cut vegetables is hung on hooks 40, of which there are preferably two on each of the cheek-plates, and the vegetables are placed in the hopper, moving down the runways 19 by gravity to position under the plunger. The operating-lever 31 is then depressed, forcing the plunger down, and the vegetables are forced by the plunger through the space between the cutting-knives 16, the vegetables being cut into cubes and falling to the receptacle below.

By changing the knife-carrying frame and employing knives spaced at different intervals the size of the piece cut may be adjusted, so that the machine may be employed for the cutting of potatoes for planting or for the cutting of potatoes or other vegetables for cooking and similar purposes.

Having thus described the invention, what is claimed is—

1. The combination in a vegetable-cutter, of a hopper having cheek-plates recessed at their lower edges, a knife-carrying frame fitting in the recesses, pivoted straps carried by the cheek-plates and serving as supports for the knife-frame, and a plunger movable vertically within the hopper.

2. The combination in a vegetable-cutter, of a hopper including cheek-plates having recessed edges, removable knife-carrying frames fitting in said recesses and forming the bottom of the hopper, U-shaped straps pivoted to the cheek-plates and forming supports for the knife-frames and serving also to prevent lateral play of the frames, and a reciprocating plunger within the hopper.

3. In a vegetable-cutter, the combination with a hopper including chutes and cheek-plates, of cutting-knives arranged at the bottom of the hopper, said chutes serving to direct the vegetables to a position above the knives, a reciprocating plunger movable within the hopper, a plunger-stem, guide-rods carried by the cheek-plates, brackets secured to the stem and having openings for the passage of the guide-rods, and an operating-lever connected to the upper end of the stem.

4. In a vegetable-cutter, the combination with a hopper including recessed cheek-plates, a detachable knife-carrying frame seated in the recesses, means for supporting the knife-frames in place, inclined runways or chutes forming part of the hopper and serving to direct the vegetables into position above the knives, vertical guide-rods carried by the cheek-plates, a plunger, a plunger-stem having brackets engaging said guide-rods, guide-rod braces connected to the upper ends of said guide-rods and to the cheek-plates, a cross-bar connecting the upper ends of the guide-rods, an operating-lever having a linked connection with the plunger, a spring extending between the operating-lever and the cross-bar, and a pedal-lever having a detachable connection with the operating-lever.

In testimony that I claim the foregoing as my own I have hereto affixed my signature in the presence of two witnesses.

ISAAC B. LANSFORD.

Witnesses:
R. L. SHIVERS,
W. J. DAVIS.